United States Patent
Cheong et al.

(10) Patent No.: US 9,747,708 B2
(45) Date of Patent: Aug. 29, 2017

(54) METHOD FOR GENERATING WRITING DATA AND AN ELECTRONIC DEVICE THEREOF

(71) Applicant: Samsung Electronics Co., Ltd., Suwon-si, Gyeonggi-do (KR)

(72) Inventors: Cheol-Ho Cheong, Seoul (KR); Yoon-Jeong Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 14/174,215

(22) Filed: Feb. 6, 2014

(65) Prior Publication Data

US 2014/0232727 A1      Aug. 21, 2014

(30) Foreign Application Priority Data

Feb. 15, 2013  (KR) ................ 10-2013-0016362

(51) Int. Cl.
　　*G06T 11/20*　　(2006.01)
　　*G06F 3/0488*　(2013.01)
　　*G06F 3/041*　　(2006.01)

(52) U.S. Cl.
　　CPC ........... *G06T 11/20* (2013.01); *G06F 3/0412* (2013.01); *G06F 3/04883* (2013.01)

(58) Field of Classification Search
　　CPC ..... G06F 3/0412; G06F 3/04883; G06T 11/20
　　See application file for complete search history.

(56) References Cited

U.S. PATENT DOCUMENTS

| | | | | |
|---|---|---|---|---|
| 5,287,417 A | * | 2/1994 | Eller | G06K 9/222 345/619 |
| 6,339,655 B1 | | 1/2002 | Aharonson et al. | |
| 6,718,075 B1 | * | 4/2004 | Yamamoto | G06F 17/3028 382/305 |
| 7,535,460 B2 | * | 5/2009 | Momose | G06F 3/04883 345/173 |
| 2006/0007176 A1 | | 1/2006 | Shen | |
| 2006/0250393 A1 | * | 11/2006 | Tsang | G06F 3/04845 345/420 |
| 2006/0290656 A1 | | 12/2006 | Soong et al. | |
| 2007/0046645 A1 | | 3/2007 | Hirota et al. | |
| 2008/0019591 A1 | | 1/2008 | Iwayama et al. | |
| 2009/0289905 A1 | * | 11/2009 | Ahn | G06F 3/04883 345/173 |

(Continued)

FOREIGN PATENT DOCUMENTS

| | | |
|---|---|---|
| CN | 102109915 A | 6/2011 |
| JP | 8-305851 A | 11/1996 |

(Continued)

*Primary Examiner* — Michelle L Sams
(74) *Attorney, Agent, or Firm* — Jefferson IP Law, LLP

(57) ABSTRACT

An apparatus and a method for generating writing data by obtaining data generation information in an electronic device are provided. A method for inputting data in the electronic device includes displaying an attribute of the writing data by detecting a first input, checking a type of the writing data by detecting a second input, and determining output writing data, and displaying the output writing data according to the attribute of the writing data. The attribute of the writing data includes at least one of a position of the writing data to generate, a length, an angle, or a vertex of a line of the writing data.

23 Claims, 17 Drawing Sheets

(56) References Cited

U.S. PATENT DOCUMENTS

2012/0268410 A1    10/2012  King et al.

FOREIGN PATENT DOCUMENTS

| KR | 10-2008-0102057 A | 11/2008 |
| KR | 10-2011-0097637 A | 8/2011 |
| KR | 10-2011-0122897 A | 11/2011 |
| KR | 10-2012-0047160 A | 5/2012 |
| WO | 2009/039870 A1 | 4/2009 |

* cited by examiner

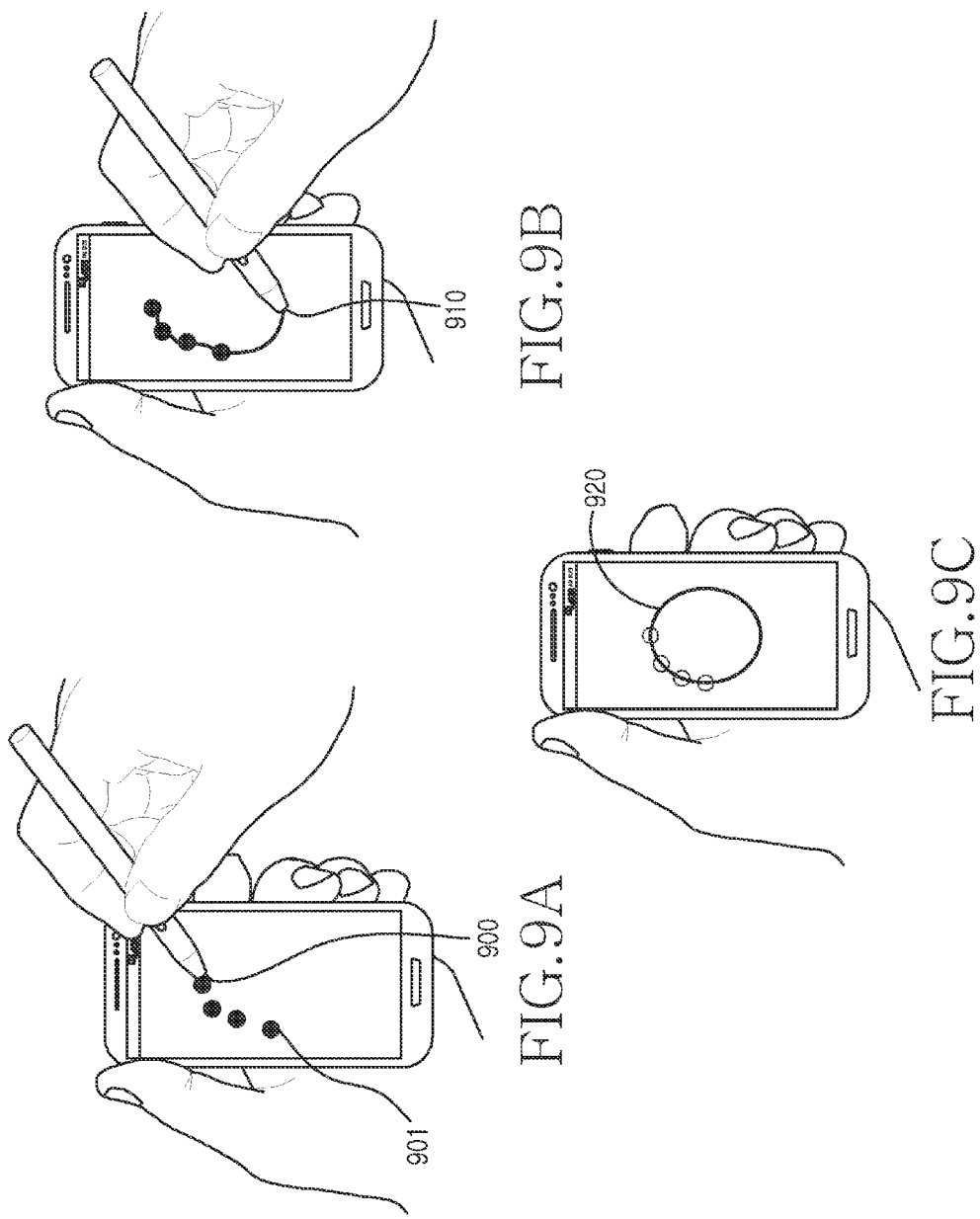

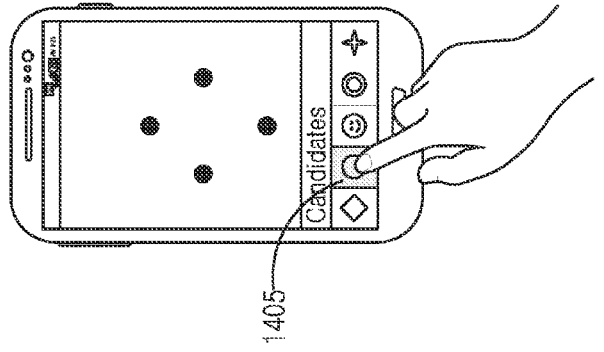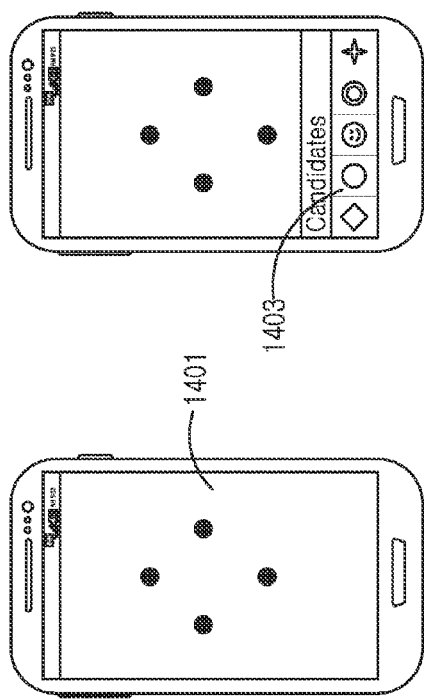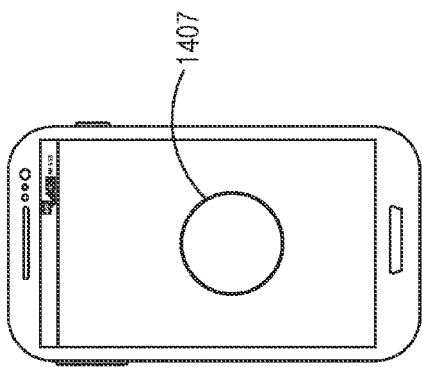

METHOD FOR GENERATING WRITING DATA AND AN ELECTRONIC DEVICE THEREOF

CROSS-REFERENCE TO RELATED APPLICATION(S)

This application claims the benefit under 35 U.S.C. §119(a) of a Korean patent application filed on Feb. 15, 2013 in the Korean Intellectual Property Office and assigned Serial No. 10-2013-0016362, the entire disclosure of which is hereby incorporated by reference.

TECHNICAL FIELD

The present disclosure relates to an apparatus and a method for generating writing data by obtaining data generation information in an electronic device.

BACKGROUND

Electronic devices allowing wireless voice communication and information exchange are rapidly becoming a necessity of modern life. Electronic devices were originally designed for wireless communication. As electronic device technologies advanced and wireless Internet was adopted, applications of the electronic device began to range from simple phone call or schedule management to games, remote control using short-range communication, and image capturing using an embedded digital camera, to thus satisfy user's needs.

As the electronic device provides a multimedia service, the information needed to process and display such multimedia services increases. Accordingly, an electronic device including a touch screen for expending a display size by enhancing spatial utilization is drawing more attention.

The touch screen is an input and display device for inputting and displaying information on a single screen. By use of the touch screen, the electronic device can increase the display area by removing a separate input device such as keypad. For example, with a full-touch type which uses the entire screen as the touch screen, the front side of the electronic device can be used as the screen to thus expand the screen size.

Recent electronic devices detect input of a digital pen or the user's finger, recognize writing data (figure, character, number, etc.) corresponding to the handwritten input, convert the writing data to normalized data, and then display the data.

Such an electronic device stores a plurality of the normalized data in advance and converts the data to the figure or the character similar to the user's input. However, since the user's input can be distorted due to camera shake, slippery surface of the electronic device, and a recognition algorithm type, the electronic device cannot accurately determine the distorted user input or the user's intended input.

FIGS. 1A and 1B are diagrams of writing data generated for the user's input in a general electronic device according to the related art.

Referring to FIGS. 1A and 1B, the electronic device 100 detects an input 101 such as figure or expression using a digital pen or a figure, and generates and displays user's intended writing data as shown in FIG. 1A. In so doing, the electronic device pre-stores the displayable normalized writing data, and determines and displays the writing data most similar to the type of the figure or the expression input by the user.

FIG. 1B depicts types of the writing data based on the user's input in the electronic device. When the user draws a square and a triangle, the electronic device generates and displays the normalized writing data most similar to the input. The electronic device confirms the normalized writing data in the type of the detected user input (e.g., the figure).

However, the electronic device can detect the distorted figure due to the user's camera shake, the slippery surface of the electronic device, and the type of the recognition algorithm. In this case, the electronic device can generate unintended writing data.

For example, when the user inputs figures 103 to draw the square and the regular triangle, the electronic device can generate the writing data 105. However, when the input figures 103 are distorted by the camera shake, the slippery surface of the electronic device, and the recognition algorithm type, the electronic device can generate the writing data 107 and 109. In this case, the user needs to delete the generated writing data and to re-input the figures 103.

When the user, who intends to generate the writing data 105, inputs the figures 103 because of the tremulous hand, the slippery surface of the electronic device, and the recognition algorithm type, the electronic device unfortunately generates the writing data 107 or 109.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to provide an apparatus and a method for generating writing data in accordance with user's intended type and position in an electronic device.

Another aspect of the present disclosure is to provide an apparatus and a method for generating writing data using attribute information indicating a position, a size, and a feature of the writing data in an electronic device.

Another aspect of the present disclosure is to provide an apparatus and a method for generating writing data using a pattern in an electronic device.

Another aspect of the present disclosure is to provide an apparatus and a method for providing a list of candidate writing data generated using attribute information in an electronic device.

In accordance with an aspect of the present disclosure, a method for inputting data in an electronic device is provided. The method includes displaying an attribute of writing data by detecting a first input, determining a type of the writing data by detecting a second input, determining output writing data, and displaying the output writing data according to the attribute of the writing data. The attribute of the writing data may include at least one of a position of the writing data to generate, a length, an angle, or a vertex of a line of the writing data.

According to another aspect of the present disclosure, the method may include changing an attribute of the displayed output writing data according to an attribute of the displayed writing data or the attribute of the writing data.

According to another aspect of the present disclosure, the first input for displaying the attribute of the writing data may be detected based on at least one of a pen pressure, a constant voltage level, a resistance, a proximity to a surface, a magnetic field strength, an input area, or an input time based on a threshold.

According to another aspect of the present disclosure, the first input for displaying the attribute of the writing data may be detected while any one of a preset input mode and a preset input region is executed.

According to another aspect of the present disclosure, the determining of the type of the writing data by detecting the second input, and the determining of the output writing data, may include when determining multiple output writing data corresponding to the type of the writing data, displaying a candidate output writing data list including the multiple output writing data, and displaying output writing data selected by a user according to the attribute of the writing data.

According to another aspect of the present disclosure, the determining of the type of the writing data by detecting the second input, and the determining of the output writing data, may include correcting the type of the writing data by detecting the second input.

According to another aspect of the present disclosure, the determining of the type of the writing data by detecting the second input, and the determining of the output writing data, may include at least one of comparing the type of the determined writing data by detecting the second input with a prestored type of the output writing data, and extracting and comparing feature information of the determined writing data by detecting the second input with the prestored feature information of the writing data.

According to another aspect of the present disclosure, the method may further include after displaying the attribute of the writing data by detecting the first input, when detecting the second input in a pattern using part of the type of the writing data, generating the output writing data by repeating the pattern corresponding to the second input according to the attribute of the writing data.

According to another aspect of the present disclosure, the method may further include after detecting the first input and the second input, detecting a third input for a figure symbol of the writing data and displaying the output writing data corresponding to the first input, the second input, and the third input.

According to another aspect of the present disclosure, the first input and the second input may be detected via at least one of a voice command input or a handwritten input.

In accordance with another aspect of the present disclosure, an electronic device is provided. The electronic device includes a display and at least one processor. The processor is configured to control to display an attribute of writing data by detecting a first input, to determine a type of the writing data by detecting a second input, to determine output writing data, and to display the output writing data according to the attribute of the writing data. The attribute of the writing data may include at least one of a position of the writing data to generate, a length, an angle, or a vertex of a line of the writing data.

According to another aspect of the present disclosure, the processor may control to change the attribute of the displayed output writing data according to an attribute of the displayed writing data or the attribute of the writing data.

According to another aspect of the present disclosure, the processor may control to detect the first input for displaying the attribute of the writing data based on at least one of a pen pressure, a constant voltage level, a resistance, a proximity to a surface, a magnetic field strength, an input area, or an input time based on a threshold.

According to another aspect of the present disclosure, the processor may control to detect the first input for displaying the attribute of the writing data while any one of a preset input mode and a preset input region is executed.

According to another aspect of the present disclosure, when determining multiple output writing data corresponding to the type of the writing data, the processor may control to display a candidate output writing data list including the determined multiple output writing data, and to display output writing data selected by a user according to the attribute of the writing data.

According to another aspect of the present disclosure, the processor may control to correct the type of the writing data by detecting the second input.

According to another aspect of the present disclosure, the processor may control to compare the type of the determined writing data by detecting the second input with a prestored type of the output writing data, or to extract and compare feature information of the determined writing data by detecting the second input with the prestored feature information of the writing data.

According to another aspect of the present disclosure, after displaying the attribute of the writing data by detecting the first input, when detecting the second input in a pattern using part of the type of the writing data, the processor may control to generate the output writing data by repeating the pattern corresponding to the second input according to the attribute of the writing data.

According to another aspect of the present disclosure, after detecting the first input and the second input, the processor may control to detect a third input for a figure symbol of the writing data, and display the output writing data corresponding to the first input, the second input, and the third input.

According to another aspect of the present disclosure, the processor may control to detect the first input and the second input via at least one of a voice command input or a handwritten input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 9A, 9B and 9C are diagrams of screens for generating writing data in an electronic device according to an embodiment of the present disclosure;

FIGS. 14A, 14B, 14C and 14D are diagrams of a screen for generating writing data in an electronic device according to an embodiment of the present disclosure;

Throughout the drawings, like reference numerals will be understood to refer to like parts, components and structures.

DETAILED DESCRIPTION

Figure 1B:
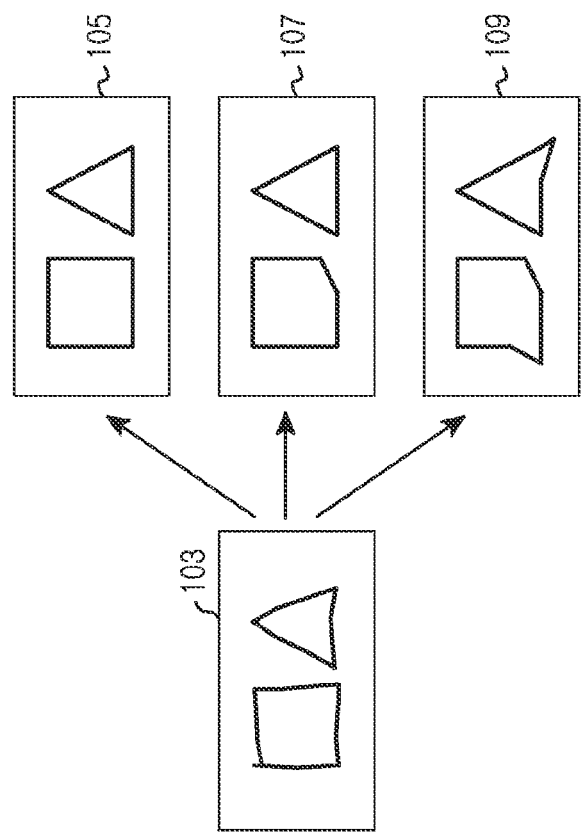
FIGS. 1A and 1B are diagrams of writing data generated for a user's input in a general electronic device.
Figure 1A:
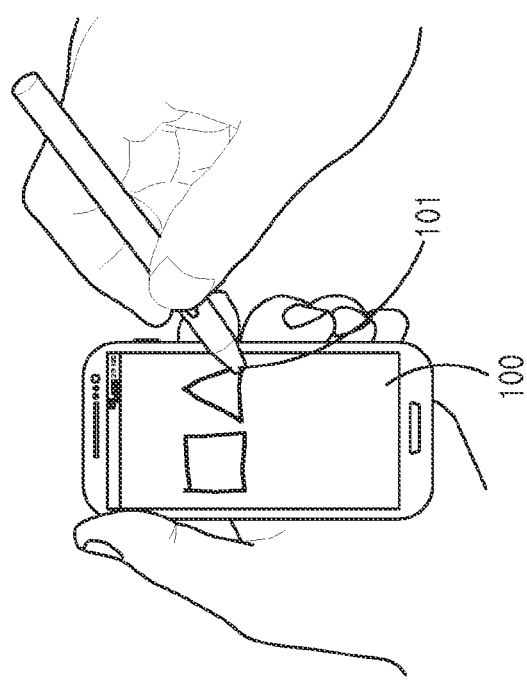

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure provide an apparatus and a method for generating writing data corresponding to data generation information input from a user in an electronic device. Herein, the writing data is an object for document data supported in the electronic device, and can include a text, a figure, an image, graphics, and the like. The writing data can be generated from a handwritten input using an input means such as figure and digital pen, and from data generation information input using voice command input. The writing data can be generated using handwritten input or voice command input.

The data generation information, which is base information for generating the writing data, can include attribute information for determining writing data position, feature, and size, and type information for determining a type of the writing data to generate. For example, the attribute information can include coordinate information for generating the writing data, center coordinates of the writing data, vertex coordinates of the writing data, and angle information.

The electronic device can receive data information from a user through a handwritten input and a voice command.

The electronic device can employ a portable electronic device such as portable terminal, mobile terminal, media player, tablet computer, handheld computer, or Personal Digital Assistant (PDA). The electronic device may be a portable electronic device combining two or more functions of those devices.

Figure 2:
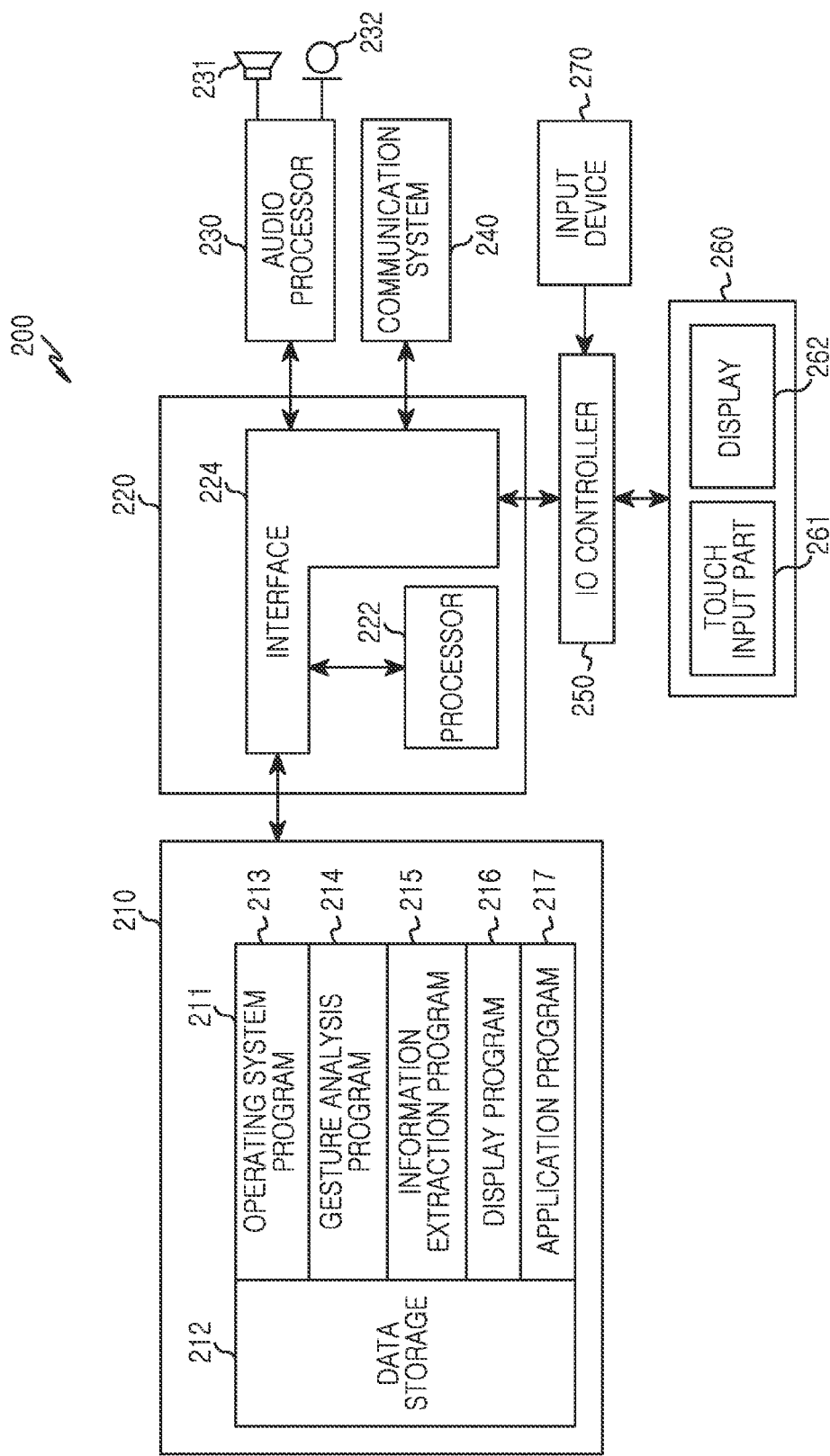
FIG. 2 is a block diagram of an electronic device according to an embodiment of the present disclosure.

FIG. 2 is a block diagram of an electronic device according to an embodiment of the present disclosure.

Referring to FIG. 2, the electronic device 200 includes a memory 210, a processor unit 220, an audio processor 230, a communication system 240, an Input Output (IO) controller 250, a touch screen 260, and an input device 270. The electronic device 200 can include a plurality of at least one of these components. For example, the electronic device 200 can include a plurality of memories and a plurality of communication systems.

The memory 210 includes a program storage 211 for storing a program to control operations of the electronic device 200 and a data storage 212 for storing data generating in program execution. For example, the data storage 212 can store updatable data such as a phonebook, outgoing messages, and incoming messages. The data storage 212 can store the writing data corresponding to the attribute information and the type information of the writing data input through the user's handwritten input or voice input.

The program storage 211 can include an operating system program 213, a gesture analysis program 214, an information extraction program 215, a display program 216, and at least one application program 217. The program in the program storage 211 may be referred to as an instruction set.

The operating system program 213 can include various software components for controlling general system operations. These include, for example, memory management and control, storage hardware (device) control and management, and power control and management. The operating system program 213 can process normal communication between various hardware (devices) and software components (modules).

The gesture analysis program 214 analyzes the user's gesture detected on a touch screen 260 of the electronic device 200, and can include various software components for analyzing the attribute and the type of the writing data to generate.

The gesture indicates a touch pattern on the touch screen of the electronic device. An external input means such as the user's finger or stylus pen applies the touch onto the touch screen of the electronic device. The gesture can indicate touch movement in a certain pattern on the touch screen. In some cases, the gesture can indicate the touch movement and touch release on the touch screen, and can include tapping at a certain point.

The information extraction program 215 can include various software components for obtaining the data generation information for generating the writing data such as attributes and type of the writing data, from the information input from the user.

The attributes of the writing data indicate the position, the size, and the feature of the writing data to generate. The type of the writing data indicates the shape of the writing data to generate.

The information extraction program 215 can obtain the attribute information such as position, line length, angle, and vertex of the writing data to generate, and the type information such as shape of the writing data to generate, from the user's input information.

The information extraction program 215 can obtain the data generation information of the writing data by detecting the input such as dot or segment line. However, since the user can input unintended data generation information, the electronic device should extract only the data generation information from the user's gesture. For this purpose, the information extraction program 215 can determine the input information after a data generation information input mode, as the data generation information of the writing data.

The information extraction program 215 can obtain the data generation information of the writing data using a pen pressure, a magnetic field strength, a constant voltage level, a proximity to the surface, an input area, and an input time, based on a threshold.

The information extraction program 215 can obtain the data generation information of the writing data using the input information of the voice command input.

The information extraction program 215 can extract the shape from the type information of the writing data and utilizes feature information (e.g., a position of an inflection point, an start point, or an end point) as the attribute information.

The feature information in the user input data is included in the user's input data and can constitute the type information. Such information can be used to determine the attributes of the writing data (e.g., the position).

The information extraction program 215 can designate a region for detecting the user's input and then utilize a plurality of inputs detected in the designated region as the data generation information of the writing data.

The information extraction program 215 can detect the user's input for defining the data generation information and then use information detected during a certain time as the data generation information of the writing data.

The information extraction program 215 can detect the user's input for defining the data generation information and then use information input until the input of a preset type as the data generation information of the writing data.

The information extraction program 215 can include various software components for detecting the user's input for changing the type of the writing data to generate.

When the user's input for defining the attribute information of the writing data is detected and the type (the position, the size, and the angle) of the attribute information is changed, the information extraction program 215 can confirm that the user's input for changing the writing data type is detected.

The information extraction program 215 can process to confirm data to display using the data generation information input by the user.

The information extraction program 215 can obtain data similar to the user's input type information.

The information extraction program 215 can extract the feature information (e.g., a position of an inflection point, an start point, or an end point) of the input data from the user's input type information, and confirm the data similar to the type information by comparing the extracted information with the pre-stored feature information of the data.

To accurately recognize the user's writing data, the information extraction program 215 can correct the type information input by the user and then determine the data similar to the corrected type information.

The information extraction program 215 can correct the type information using at least one of thinning filter, smoothing filter, hook elimination, distance filter, or angle filter of the type information.

The information extraction program 215 can forward the extracted attribute and type information of the writing data to the display program 216.

The display program 216 can include various software components for providing and displaying graphics on the touch screen 260. The term 'graphics' can embrace a text, a webpage, an icon, a digital image, a video, and an animation.

The display program 216 can process to display the writing data generation corresponding to the attribute information and the type information of the writing data input by the user.

The application program 217 includes a software component for at least one application program installed in the electronic device 200.

The processor unit 220 includes at least one processor 222 or an interface 224. The processor 222 and the interface 224 can be integrated onto at least one integrated circuit or embodied separately.

The interface 224 can function as the memory interface for controlling access of the processor 222 and the memory 210. The interface 224 can also function as a peripheral interface for controlling connection between an IO peripheral of the electronic device 200, and the processor 222.

The processor 222 can control to generate the writing data corresponding to the attribute information and the type information input by the user, using at least one software program. In so doing, the processor 222 can control to execute at least one program stored in the memory 210 and to provide the function corresponding to the program. For example, the processor 222 can include a display processor for generating the writing data using the attribute information and the type information input by the user and displaying the generated writing data.

The writing data generation function of the electronic device 200 can be fulfilled using the software such as a program stored in the memory 210 or the hardware such as the display processor.

The audio processor 230 provides an audio interface between the user and the electronic device 200 through a speaker 231 and a microphone 232. For example, the audio processor 230 can receive the attribute information and the type information used to generate the writing data.

The communication system 240 can perform a communication function for voice communication and data communication of the electronic device 200. The communication system 240 may be divided into a plurality of communication submodules supporting different communication networks. The communication networks can include, but is not limited to, a Global System for Mobile communication (GSM) network, an Enhanced Data GSM Environment (EDGE) network, a Code Division Multiple Access (CDMA) network, a Wideband-CDMA network, a Long Term Evolution (LTE) network, an Orthogonal Frequency Division Multiple Access (OFDMA) network, a wireless Local Area Network (LAN), a Bluetooth network, and Near Field Communication (NFC).

The IO controller 250 can provide an interface between the IO device such as touch screen 260 and input device 270, and the interface 224.

The touch screen 260, which is an IO device for outputting and inputting information, includes a touch input part 261 and a display 262.

The touch input part 261 can provide touch information detected through a touch panel, to the processor unit 220 via the IO controller 250. The touch input part 261 can change the touch information to an instruction such as touch_down, touch_move, and touch_up and provide the instruction to the processor unit 220. The touch input part 261 can issue the attribute information and the type information of the writing data to generate.

The display 262 can display status information of the electronic device 200, a character input by the user, a moving picture, and a still picture. For example, the display 262 can display the writing data generated with the attribute information and the type information input by the user.

The input device 270 can provide input data generated by the user's selection to the processor unit 220 through the IO controller 250. For example, the input device 270 can include only a control button to control the electronic device 200. For example, the input device 270 can include a keypad for receiving the input data from the user. The input device 270 can generate the attribute information and the type information of the writing data to generate.

The electronic device 200 can further include elements (not shown) for providing additional functions, such as a camera module for capturing an image or the video, a broadcasting receiver module for receiving broadcast content, a digital music player module such as an MP3 module, a close-range wireless communication module for close-range wireless communication, and a proximity sensor module for sensing proximity, and their software.

Figure 3:
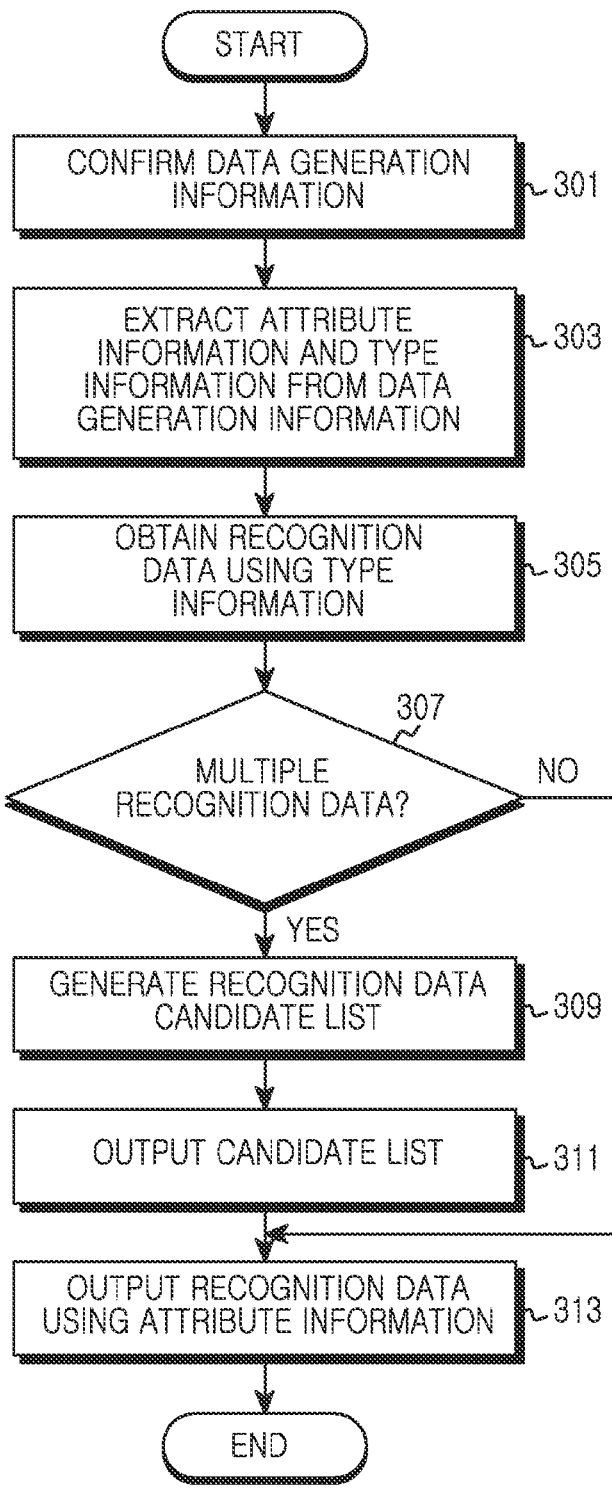
FIG. 3 is a flowchart of a method for generating writing data in an electronic device according to an embodiment of the present disclosure.

FIG. 3 is a flowchart of a method for generating writing data in an electronic device according to an embodiment of the present disclosure.

Referring to FIG. 3, the writing data is an object for document data supported in the electronic device, and can include base information for generating the writing data including text, figures, images, and graphs.

The objects can include stroke information such as one or more lines or dots, and the stroke information of the object can be referred to as the writing data.

In operation 301, the electronic device can confirm the data generation information. The data generation information is the base information for determining the attributes and the type of the writing data to generate, the attributes of the writing data can include the position, feature, and size of the writing data, and the type of the writing data can be the shape of the writing data to generate.

For example, when the user wants to generate a circle in a diameter of 5 based on x, y coordinates "10, 20", the type of the writing data to generate is the circle and the attributes include the diameter of 5 based on the coordinates "10, 20".

The electronic device can receive such data generation information through the user's voice command input and handwritten input. To receive the data generation information through the voice command input, it is advantageous that the electronic device executes an application for the writing data input. The application can include a memo application, a schedule application, a picture editing application, a document application, and the like.

The application can have a voice recognition function. After detecting a menu selection or a gesture to initiate the voice recognition function, the electronic device can obtain the data generation information by analyzing the user's voice. For example, if the user says "Draw a square with the attribute of 5×5 at the coordinates 'x 10, y 20'", then the electronic device can recognize the voice and obtain the attributes and the type of the writing data to generate.

The position and the size of the writing data can correspond to the attribute information, and the square information can be the type information.

To receive the data generation information through handwritten input, the electronic device can include an input means for detecting the user's gesture and obtain the data generation information by detecting the user's gesture. The input means for detecting the gesture can include a touchpad, a touch screen, a mouse, a stylus pen, a joystick, a data glove, and the like. The electronic device can obtain not only two-dimensional data generation information input through the input means such as touchpad, touch screen, mouse, stylus pen, and joystick, but also three-dimensional data generation information input through the input means such as data glove or camera.

Typically, the handwritten input can be detected by detecting the gesture for inputting the stroke information such as dot and line. The gesture can create the touch pattern on the touch screen of the electronic device using the digital pen or the finger. The touch is applied onto the touch screen of the electronic device using the external input means such as user's finger or stylus pen, and the gesture can indicate touch movement on the touch screen. In some cases, the gesture can indicate the touch movement and the touch release on the touch screen, and can include the tapping at a certain point.

The electronic device extracts the attribute information and the type information from the data generation information in operation 303, and obtains recognition data using the type information in operation 305.

The recognition data can be generated using the type information from the user, and can be obtained by determining the recognition data similar to the type information from the user among the pre-stored recognition data.

For example, the recognition data corresponding to the type information indicating the square drawn by the user can include a rectangular figure displayed in the application. The recognition data can be normalized by smoothing distortion and protrusion of the overlapped strokes in the handwritten input. Further, the recognition data may be the output writing data displayed on the display.

The electronic device can determine the data similar to the type information input by the user. For example, the electronic device can extract the feature information (the position of the inflection point) of the input data from the type information input by the user, and determine the data similar to the type information by comparing the extracted information with the feature information of the pre-stored data.

To accurately recognize the recognition data to be generated by the user, the electronic device can correct the type information input by the user and then determine the recognition data similar to the corrected type information.

In operation 307, the electronic device determines whether a plurality of recognition data corresponds to the type information.

The electronic device stores information of the multiple recognition data. The multiple recognition data can be similar to the type information from the user.

If multiple recognition data corresponds to the type information, the electronic device generates a recognition data candidate list in operation 309, and displays the generated candidate list in operation 311.

In operation 313, the electronic device displays the recognition data using the attribute information. The attribute information indicates the position, feature, and size information of the writing data as explained earlier, and the electronic device can generate the recognition data corresponding to the type information at the position designated by the user. Such recognition data displayed based on the attribute information can indicate the writing data.

Figure 4:
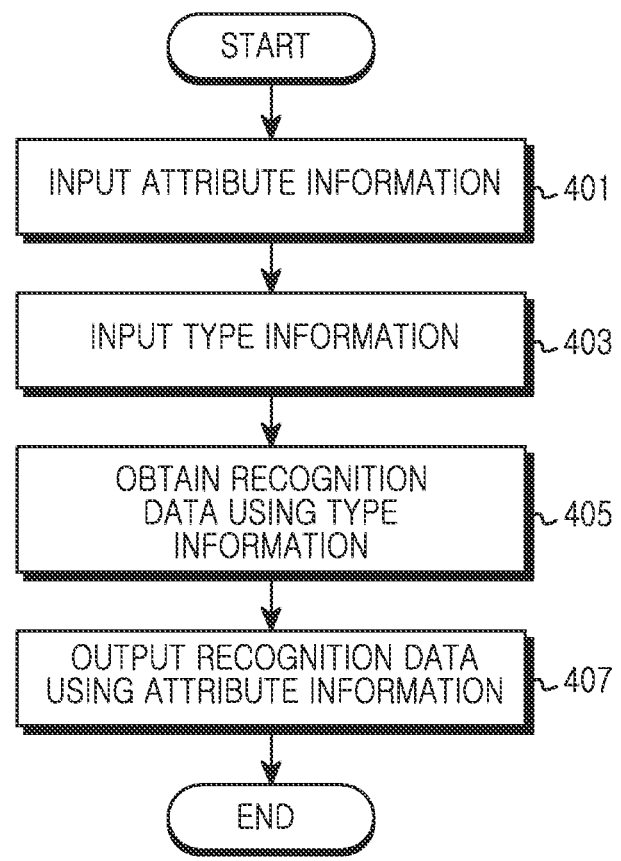
FIG. 4 is a flowchart of a method for generating writing data in an electronic device according to an embodiment of the present disclosure.

FIG. 4 is a flowchart of a method for generating the writing data in the electronic device according to an embodiment of the present disclosure.

Referring to FIG. 4, the electronic device detects the attribute information input by the user in operation 401. The attribute information indicates the position, feature, and size information of the generated writing data as mentioned earlier.

In operation 403, the electronic device detects the type information input by the user. The type information indicates the shape information of the writing data to generate as mentioned earlier.

The electronic device can receive the attribute information and the type information through the handwritten input using the input means such as finger and digital pen or the voice command input. The electronic device may receive the attribute information and the type information using one or both of the handwritten input and the voice command input.

While the electronic device can receive the attribute information and the type information at the same time and then divide the attribute information and the type information as described in FIG. 3, the attribute information and the type information can be input at different times.

According to an embodiment of the present disclosure, the electronic device can receive the type information after the attribute information is defined, or vice versa.

In operation 405, the electronic device obtains the recognition data using the type information.

The recognition data can be provided using the type information from the user, and can be obtained by determining the recognition data similar to the type information from the user among the pre-stored recognition data.

For example, the recognition data corresponding to the type information indicating the square drawn by the user can include the rectangular figure displayed in the application. Such recognition data can be normalized by smoothing the distortion and the protrusion of the overlapped strokes in the handwritten input.

When the multiple recognition data are similar to the type information from the user, the electronic device can generate and display the recognition data candidate list as described above. Accordingly, the user of the electronic device can directly select the recognition data to display from the recognition data of the candidate list.

In operation 407, the electronic device displays the recognition data using the attribute information.

The attribute information indicates the position, feature, and size information of the generated writing data as stated earlier. The electronic device can generate the recognition data corresponding to the type information at the user's designated position. The recognition data displayed based on the attribute information can indicate the writing data.

Figure 5:
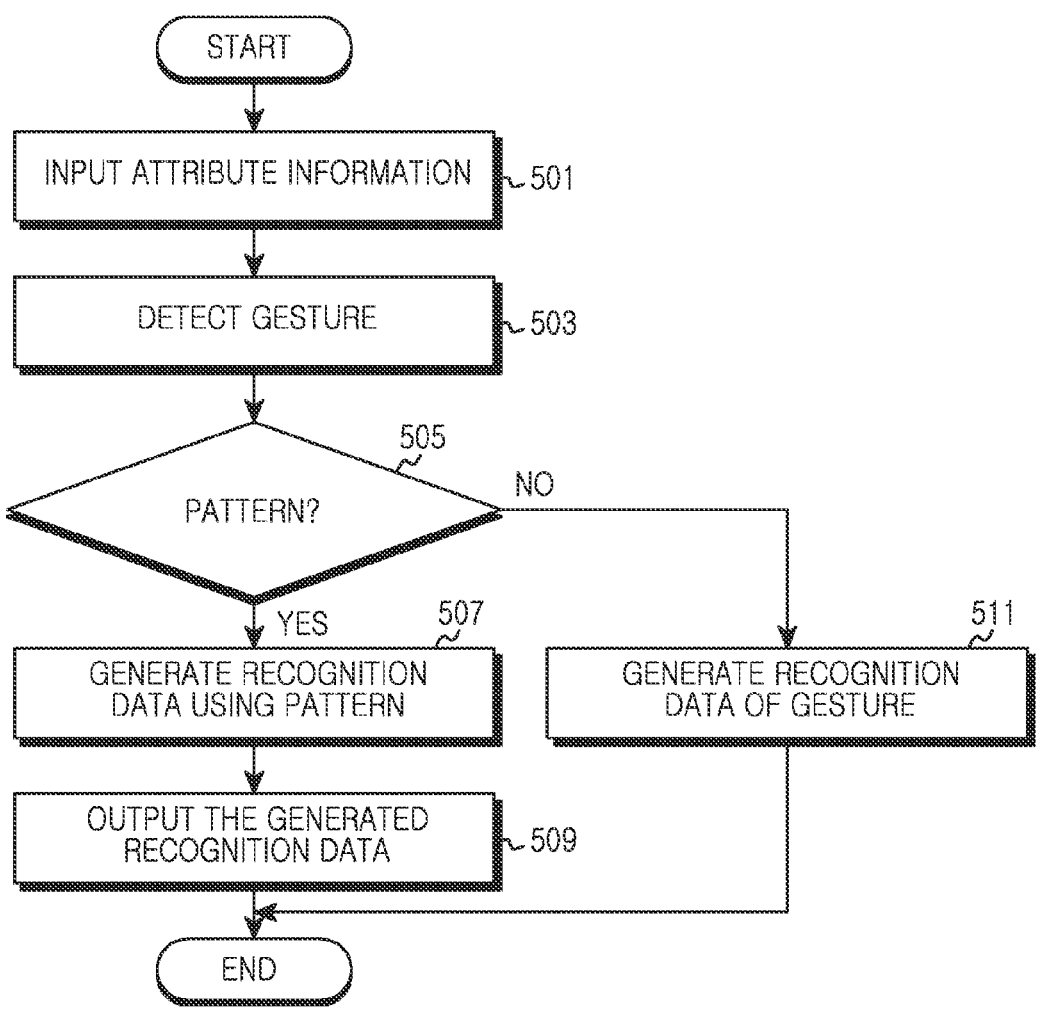
FIG. 5 is a flowchart of a method for generating writing data in an electronic device according to an embodiment of the present disclosure.

FIG. 5 is a flowchart of a method for generating writing data in an electronic device according to an embodiment of the present disclosure.

Referring to FIG. 5, the electronic device detects the attribute information input by the user in operation 501. The attribute information indicates the position, feature, and size information of the generated writing data as mentioned earlier.

In operation 503, the electronic device detects the gesture. The electronic device detects the user's gesture with respect to the input attribute information. For example, the electronic device can detect the gesture which represents the type of the writing data to generate by connecting part of the input attribute information.

In operation 505, the electronic device determines the pattern corresponding to the user's gesture for the input attribute information. The determined pattern signifies that the user's gesture of the same rule is detected. When the electronic device determines that the gesture has no pattern, the electronic device generates the recognition data corresponding to the gesture in operation 511.

In operation 507, the electronic device generates the recognition data using the pattern of the gesture.

For example, the sinusoid repeats the same curve at regular intervals. To generate the sinusoid, the user can input the feature information of the inflection position of the sinusoid and draw the sinusoid in at least one cycle. The electronic device can generate the sinusoid including the same curve in every cycle based on the curve pattern of one cycle.

In operation 509, the electronic device displays the generated recognition data using the pattern or the gesture.

Figure 6A:
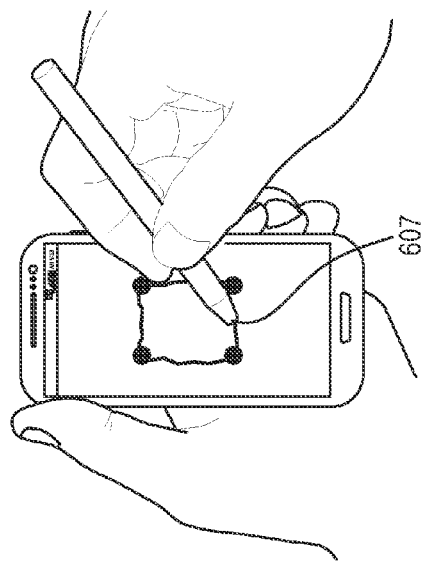
FIGS. 6A, 6B and 6C are diagrams of screens for generating writing data in an electronic device according to an embodiment of the present disclosure.
Figure 6B:
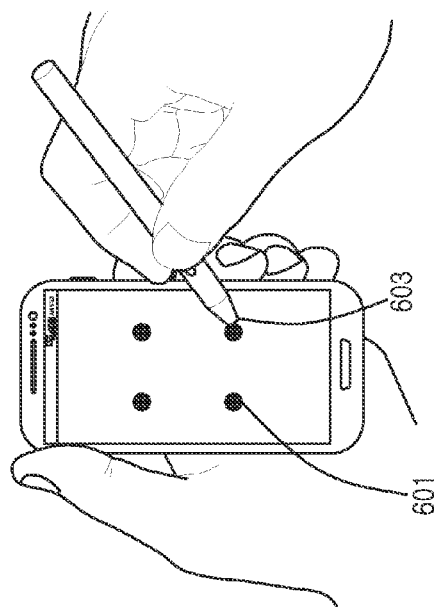
Figure 6C:
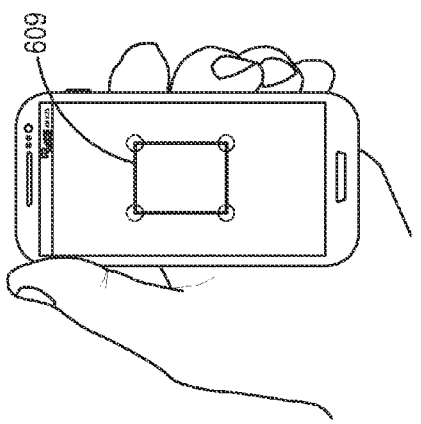

FIGS. 6A to 6C depict screens for generating writing data in an electronic device according to an embodiment of the present disclosure.

Referring to FIGS. 6A to 6C, the electronic device can generate writing data including text, figures, images, and graphs as the object of the document data, using the base information for determining the attributes and the type of the writing data as described above.

The attributes of the writing data indicate the position, the feature, and the size of the generated writing data, and the type of the writing data can be the shape of the writing data to generate. For example, the attribute information can include the coordinate information for generating the writing data, the center coordinates of the writing data, and the vertex coordinates of the writing data.

For example, the electronic device can detect the user's gesture 603 defining four attributes 601 as shown in FIG. 6A, and then detect the user's gesture 607 defining the type information as shown in FIG. 6B.

In FIGS. 6A to 6C, the attribute information can include vertex positions (coordinates) of the quadrangle to draw. The type information can include the input of the quadrangle displayed by connecting the attributes with the hand.

The electronic device can confirm and display the recognition data 609 being the quadrangle corresponding to the type information at the four vertexes defined with the attribute information as shown in FIG. 6C.

When the user of the electronic device defines the position of the writing data on the touch screen and then defines the type of the data to draw, the electronic device displays the data of the type as defined by the user at the defined position.

While the quadrangle being the type information passes the four points being the attribute information in FIGS. 6A to 6C, the type information can be input outside the attribute information region.

The electronic device can compare the input type information with a pre-stored template and determine the most similar data as the recognition data to draw.

The electronic device can confirm the feature representing the type in the input type information, and determine the data having the most similar feature, among the pre-stored features, as the recognition data to draw.

When the recognition is completed, the attribute information (e.g., the vertexes) may be automatically deleted from the display after a certain time. Fundamentally, while the attribute information is unnecessary after the data recognition, it may be helpful to provide the user an opportunity to change the position of the input attribute information.

FIGS. 7A to 7D depict screens for generating writing data in an electronic device according to an embodiment of the present disclosure.

Referring to FIGS. 7A to 7D, the electronic device can generate writing data including text, figures, images, and graphs as objects of the document data, using the base information for determining the attributes and the type of the writing data as described above.

The attributes of the writing data indicate the position, the feature, and the size of the generated writing data, and the type of the writing data can be the shape of the writing data to generate.

Figure 7B:
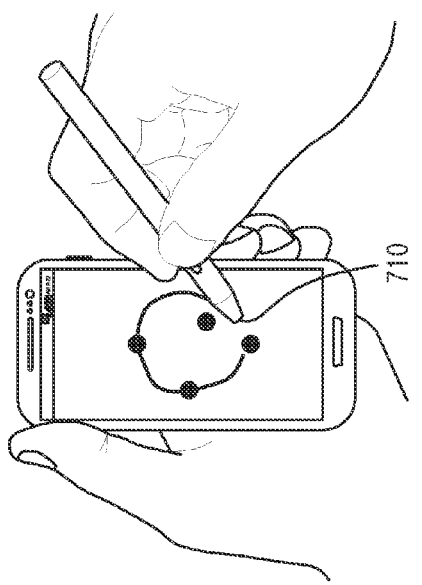
FIGS. 7A, 7B, 7C and 7D are diagrams of screens for generating writing data in an electronic device according to an embodiment of the present disclosure.
Figure 7D:
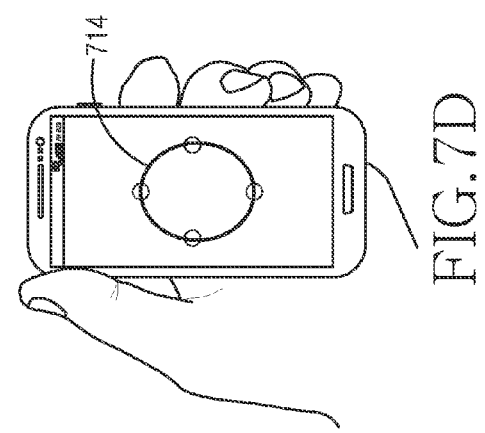
Figure 7A:
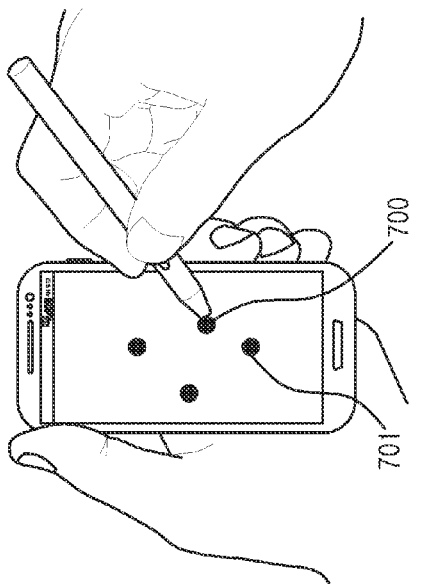

For example, the electronic device can detect the user's gesture 700 defining four attributes 701 as shown in FIG. 7A, and then detect the user's gesture 710 defining the type information as shown in FIG. 7B.

In FIGS. 7A to 7D, the attribute information can include the position of the circumference to draw. The type information can include the input of the circle displayed by connecting the attributes with the hand.

Generally, the attribute information relates to the position of the generated writing data. The position is roughly defined by the user's gesture. When the user wants to draw a concentric circle, the writing data may not include all of the attribute information.

Figure 7C:
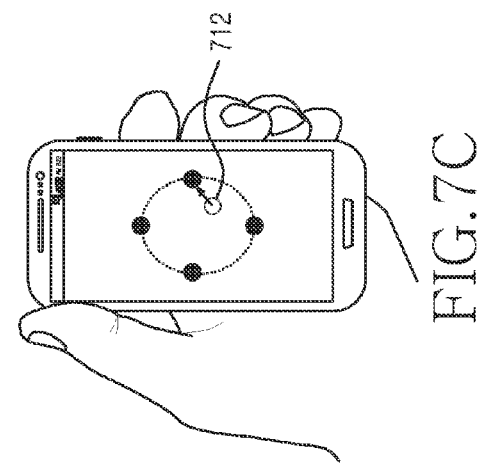

The electronic device can change the position 712 of the attribute outside the concentric circle as shown in FIG. 7C, and display the concentric circle 714 passing all of the attributes as shown in FIG. 7D.

Figure 8B:
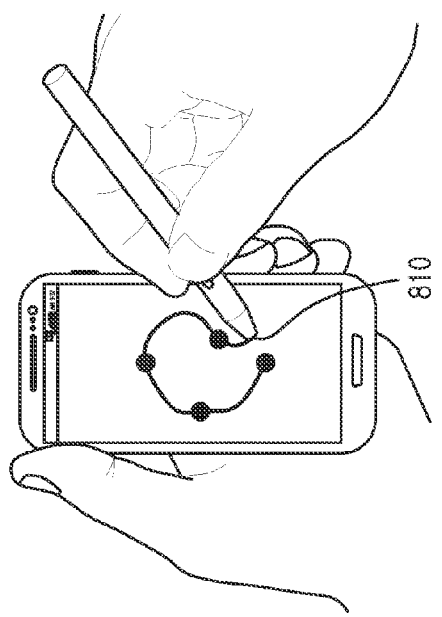
FIGS. 8A, 8B and 8C are diagrams of screens for generating writing data in an electronic device according to an embodiment of the present disclosure.
Figure 8A:
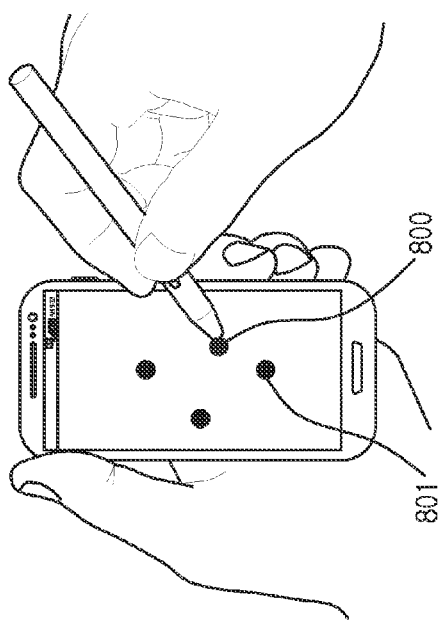
Figure 8C:
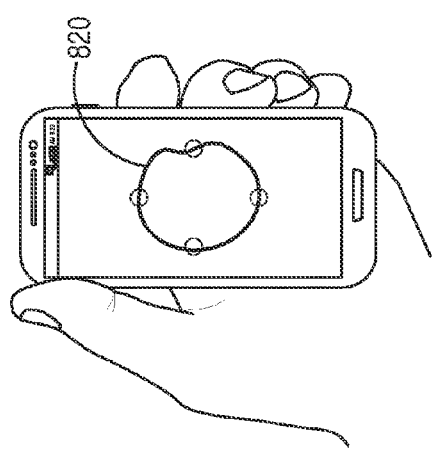

FIGS. 8A to 8C depict screens for generating writing data in an electronic device according to an embodiment of the present disclosure.

Referring to FIGS. 8A to 8C, the electronic device can generate writing data including text, figures, images, and graphs as objects of the document data, using the base information for determining the attributes and the type of the writing data as aforementioned.

The attributes of the writing data indicate the position, the feature, and the size of the generated writing data, and the type of the writing data can be the shape of the writing data to generate.

For example, the electronic device can detect the user's gesture 800 defining four attributes 801 as shown in FIG. 8A, and then detect the user's gesture 810 defining the type information as shown in FIG. 8B.

In FIGS. 8A to 8C, the attribute information can include the position of the circumference to draw. The type information can include the input of the circle displayed by connecting the attributes with the hand.

Generally, the attribute information relates to the position of the generated writing data. The position is roughly defined by the user's gesture, and the user can generate and display the writing data passing all of the attributes.

In FIG. 8C, the electronic device generates and displays the writing data 820 based on the position of the attributes passing the type information.

FIGS. 9A to 9C depict screens for generating writing data in an electronic device according to an embodiment of the present disclosure.

Referring to FIGS. 9A to 9C, the electronic device can generate writing data including text, figures, images, and graphs as objects of the document data, using the base information for determining the attributes and the type of the writing data as described above.

The attributes of the writing data indicate the position, the feature, and the size of the generated writing data, and the type of the writing data can be the shape of the writing data to generate.

For example, the electronic device can detect the user's gesture 900 defining four attributes 901 as shown in FIG. 9A, and then detect the user's gesture 910 including the pattern of the same rule as shown in FIG. 9B.

In FIGS. 9A to 9C, the attribute information can be part of the position of the circumference to draw. The pattern in the gesture is the user input which creates the same circumference and can include the user's input drawing part of the circle. In this case, the electronic device can generate and display the writing data 920 using the pattern of the gesture as shown in FIG. 9C.

Figure 10B:
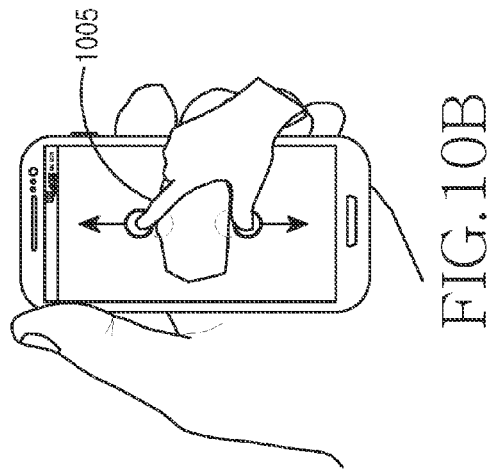
FIGS. 10A, 10B and 10C are diagrams of screens for generating writing data in an electronic device according to an embodiment of the present disclosure.
Figure 10A:
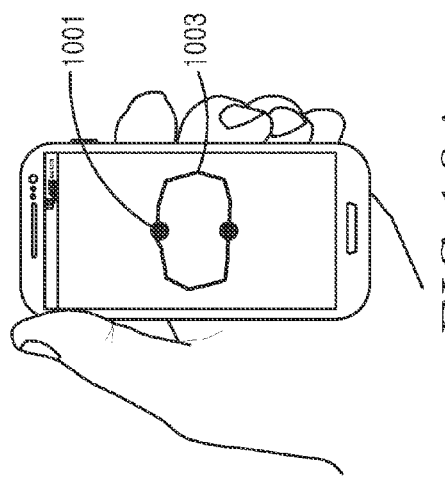
Figure 10C:
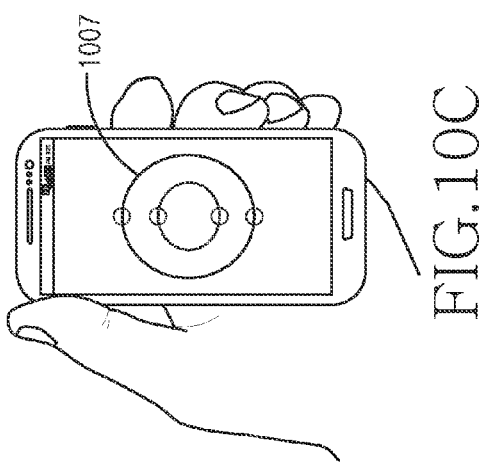

FIGS. 10A to 10C depict screens for generating writing data in an electronic device according to an embodiment of the present disclosure.

Referring to FIGS. 10A to 10C, the electronic device can generate writing data including text, figures, images, and graphs as objects of the document data, using the base information for determining the attributes and the type of the writing data as described above.

The attributes of the writing data indicate the position, the feature, and the size of the generated writing data, and the type of the writing data can be the shape of the writing data to generate.

As shown in FIG. 10A, the electronic device can detect the user's gesture defining two attributes 1001 and type information 1003 of the circle.

Generally, the electronic device can detect the attribute information defining the position of the writing data and the type information defining the type of the writing data, and thus generate the writing data based on the position of the attribute information.

Since the position of the attribute information detected by the electronic device may not be the user's intended position, the electronic device can detect the user's input 1005 changing the position of the attribute information as shown in FIG. 10B.

The electronic device can generate and display the writing data 1007 based on the attribution information position changed by the user as shown in FIG. 10C.

FIGS. 11A to 11D depict screens for generating writing data in an electronic device according to an embodiment of the present disclosure.

Referring to FIGS. 11A to 11D, the electronic device can generate writing data including text, figures, images, and graphs as objects of the document data, using the base information for determining the attributes and the type of the writing data as described above.

The attributes of the writing data indicate the position, the feature, and the size of the generated writing data, and the type of the writing data can be the shape of the writing data to generate.

Figure 11B:
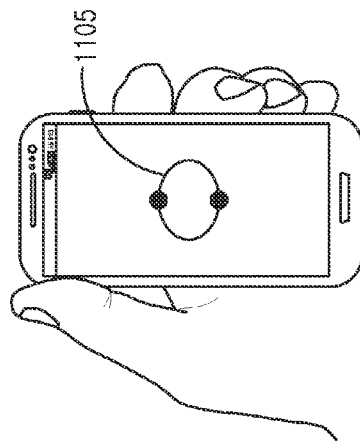
FIGS. 11A, 11B, 11C, and 11D are diagrams of screens for generating writing data in an electronic device according to an embodiment of the present disclosure.
Figure 11D:
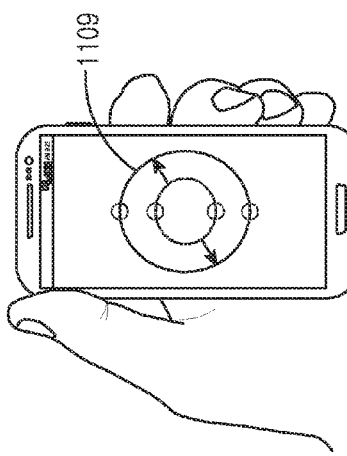
Figure 11A:
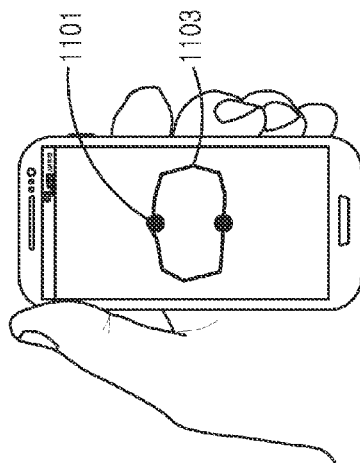

As shown in FIG. 11A, the electronic device can detect the user's gesture defining two attributes 1101 and type information 1103 of the circle.

As shown in FIG. 11B, the electronic device can detect the attribute information defining the position of the writing data and the type information defining the type of the writing data, and thus generate and display the writing data 1105 based on the position of the attribute information.

Figure 11C:
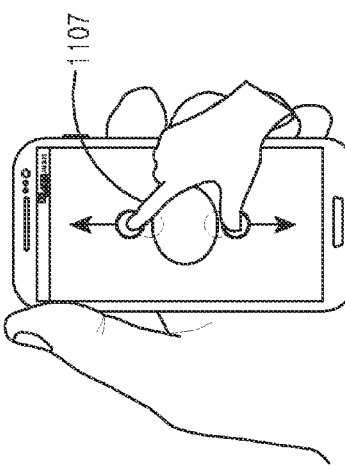

Since the position of the attribute information detected by the electronic device may not be the user's intended position, the electronic device can detect the user's input 1107 changing the attribute of the generated writing data as shown in FIG. 11C.

The electronic device can generate and display the writing data 1109 based on the attribution information position changed by the user as shown in FIG. 11D.

In so doing, the electronic device can detect the gesture for changing at least one of the size, the position, or the direction of the generated writing data.

FIGS. 12A to 12D depict screens for generating writing data in an electronic device according to an embodiment of the present disclosure.

Referring to FIGS. 12A to 12D, the electronic device can generate writing data including text, figures, images, and graphs as objects of the document data, using the base information for determining the attributes and the type of the writing data as described above.

The attributes of the writing data indicate the position, the feature, and the size of the generated writing data, and the type of the writing data can be the shape of the writing data to generate.

Figure 12A:
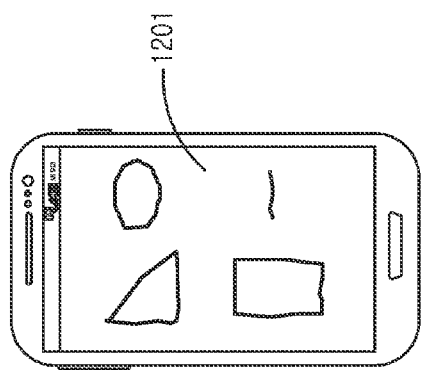
FIGS. 12A, 12B, 12C, and 12D are diagrams of screens for generating writing data in an electronic device according to an embodiment of the present disclosure.

As shown in FIG. 12A, the electronic device can detect the user's gesture 1201 drawing a triangle, a circle, a square, and a line. As described above, the position of the detected gesture can be the attribute information and the figure drawn by the user's gesture can be the type information.

Figure 12B:
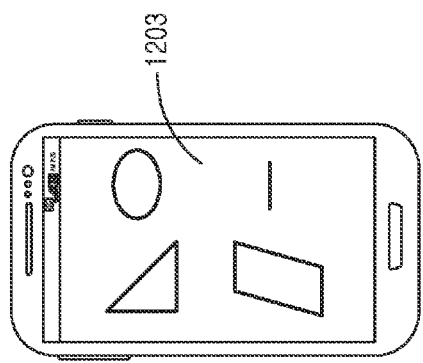

Upon detecting the gesture, the electronic device can determine and display the most similar data 1203 by comparing the pre-stored information with the type information detected by the user's gesture as shown in FIG. 12B.

Alternatively, the electronic device can generate the writing data by detecting a figure, a symbol, and a number besides the attribute information and the type information.

Figure 12C:
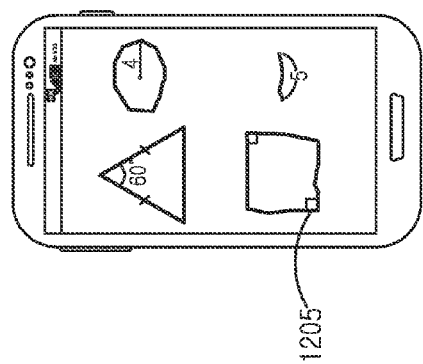
Figure 12D:
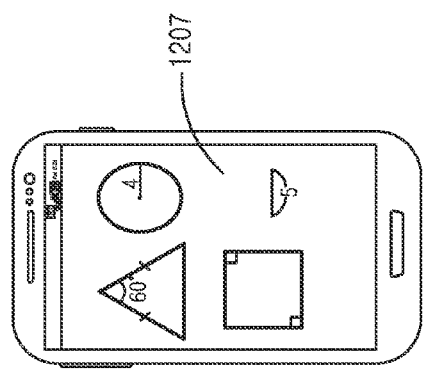

When detecting the symbol 1205 indicating a right angle together with the type information as shown in FIG. 12C, the electronic device can generate and display the writing data 1207 with the symbol property applied as shown in FIG. 12D.

When the type information input by the user is not the square in FIG. 12C, the square is displayed according to the symbol indicating the right angle in FIG. 12D.

When the type information input by the user is the oval in FIG. 12C, the concentric circle in the radius of 4 is displayed according to the symbol indicating the radius in FIG. 12D.

FIGS. 13A to 13F depict screens for generating writing data in an electronic device according to an embodiment of the present disclosure.

Referring to FIGS. 13A to 13F, the electronic device can recognize the base information for determining the attributes and the type of the writing data using the voice command input.

Figure 13A:
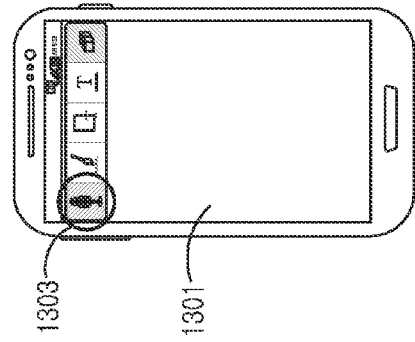
FIGS. 13A, 13B, 13C, 13D, 13E and 13F are diagrams of screens for generating writing data in an electronic device according to an embodiment of the present disclosure.

As shown in FIG. 13A, the electronic device can display a menu 1303 for recognizing the user's voice in part of an application execution screen 1301 for inputting the writing data.

When detecting the user's touch or gesture for selecting the menu, the electronic device can prepare to analyze the attribute information and the type information by executing the voice recognition function.

The electronic device can obtain at least one of the attribute information or the type information through the voice command input.

Figure 13B:
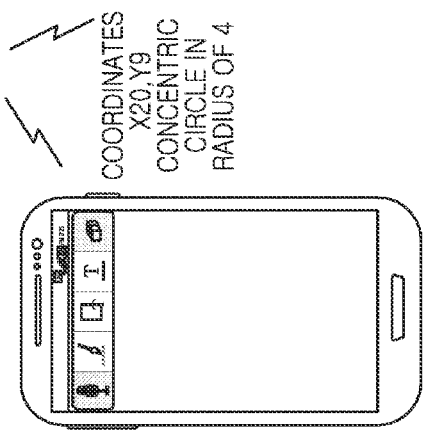
Figure 13C:
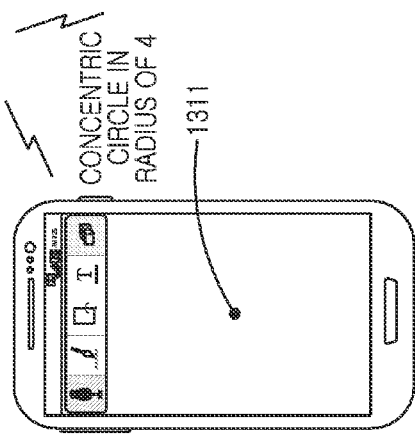
Figure 13D:
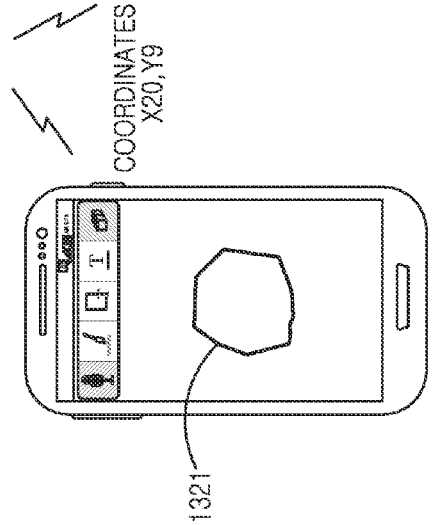
Figure 13E:
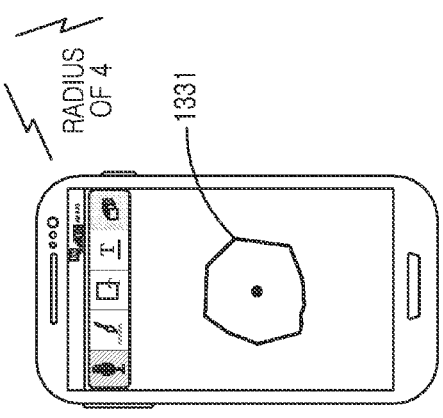

FIG. 13B depicts the screen when the electronic device obtains the attribute information and the type information using the voice command input, and FIGS. 13C, 13D, and 13E depict screens when the electronic device obtains the attribute information and the type information using both of the handwritten input and the voice command input.

Referring to FIG. 13C, the electronic device confirms coordinates 1311 of the writing data generated through the handwritten input, and confirms the type information about the concentric circle in the radius of 4 through the voice command input.

Referring to FIG. 13D, the electronic device confirms a type 1321 of the writing data through the handwritten input, and confirms coordinates of the writing data through the voice command input.

Referring to FIG. 13E, the electronic device confirms type and position 1331 of the writing data through the handwritten input, and confirms diameter information of the writing data through the voice command input.

Figure 13F:
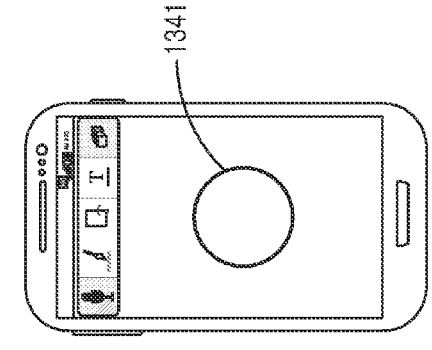

FIG. 13F depicts the screen displaying the writing data 1341 generated using the attribute information and the type information based on the voice command input or the handwritten input.

FIGS. 14A to 14D depict screens for generating the writing data in the electronic device according to an embodiment of the present disclosure.

Referring to FIGS. 14A to 14D, the electronic device can detect attribute information 1401 input by the user as shown in FIG. 14A. The attribute information indicates the position, feature, and size information of the generated writing data as described above.

The electronic device can determine recognition data of different types using the attribute information, and then display a candidate list 1403 of the recognition data as shown in FIG. 14B.

The electronic device displays the candidate list notifying that diamond-shaped candidate recognition data, circular candidate recognition data, smile emoticon candidate recognition data, doughnut-shaped candidate recognition data, and star-shaped candidate recognition data can be generated using the four attributes.

The electronic device can display the candidate recognition data of the displayed candidate list based on the attribute information.

When detecting the user's touch or gesture 1405 for selecting the circular candidate recognition data in the displayed candidate list as shown in FIG. 14C, the electronic device can generate and display the recognition data 1407 passing the four attributes as shown in FIG. 14D.

Figure 15C:
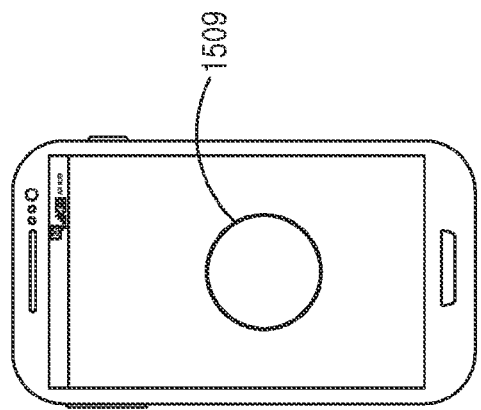
FIGS. 15A, 15B and 15C are diagrams of a screen for generating writing data in an electronic device according to an embodiment of the present disclosure.
Figure 15B:
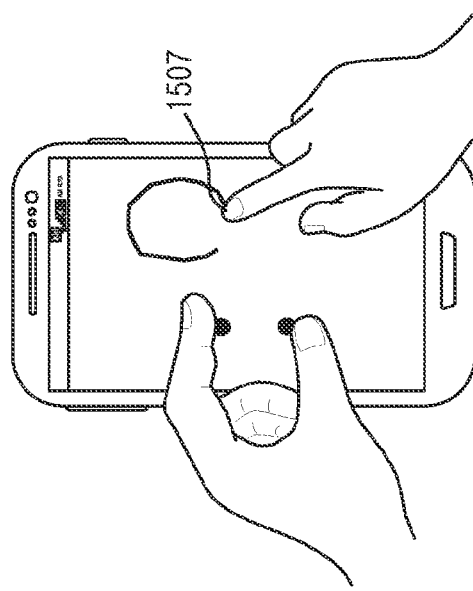
Figure 15A:
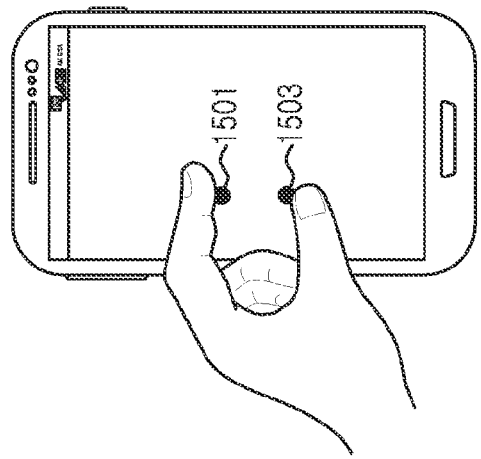

FIGS. 15A to 15C depict screens for generating writing data in an electronic device according to an embodiment of the present disclosure.

Referring to FIGS. 15A to 15C, the electronic device can generate writing data including text, figures, images, and graphs as objects of the document data, using the base information for determining the attributes and the type of the writing data as described above.

The attributes of the writing data indicate the position, the feature, and the size of the generated writing data, and the type of the writing data can be the shape of the writing data to generate.

The electronic device can detect the user's gestures 1501 and 1503 for defining two attributes as shown in FIG. 15A, and then detect the user's gesture 1507 for defining the type information as shown in FIG. 15B.

The attribute information can include two dots defining the diameter of the circle. The type information of FIGS. 15A to 15C can include the hand gesture drawing the circle with the input attribute information.

While the electronic device can detect the type information above the defined attribute information, the electronic device can detect the type information 1507 at the position regardless of the attribute information. In this case, the electronic device can confirm the recognition data being the circle corresponding to the type information and display the circle 1509 based on the two defined dots being the attribute information.

When the user of the electronic device defines the position of the writing data on the touch screen and then defines the type of the data to draw, the electronic device displays the data of the type defined by the user at the defined position.

Figure 16A:
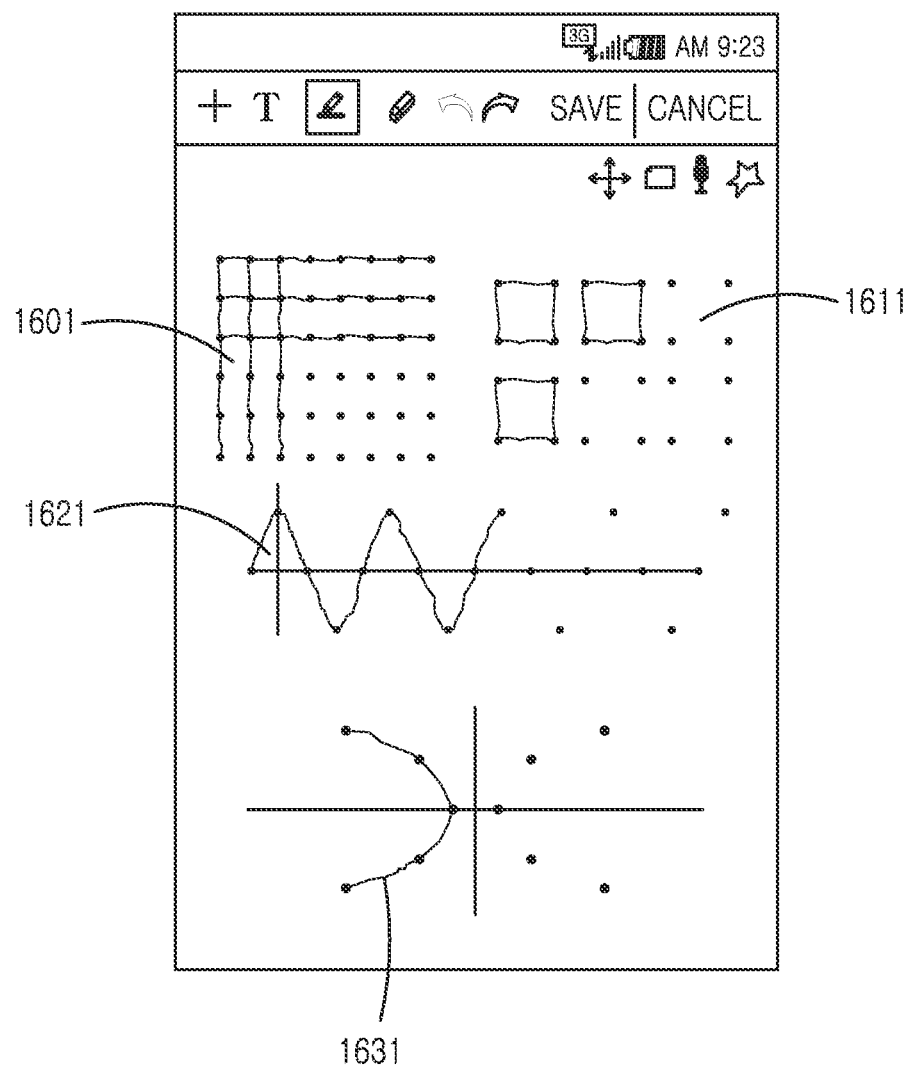
FIGS. 16A and 16B are diagrams of a screen for generating writing data in an electronic device according to an embodiment of the present disclosure.
Figure 16B:
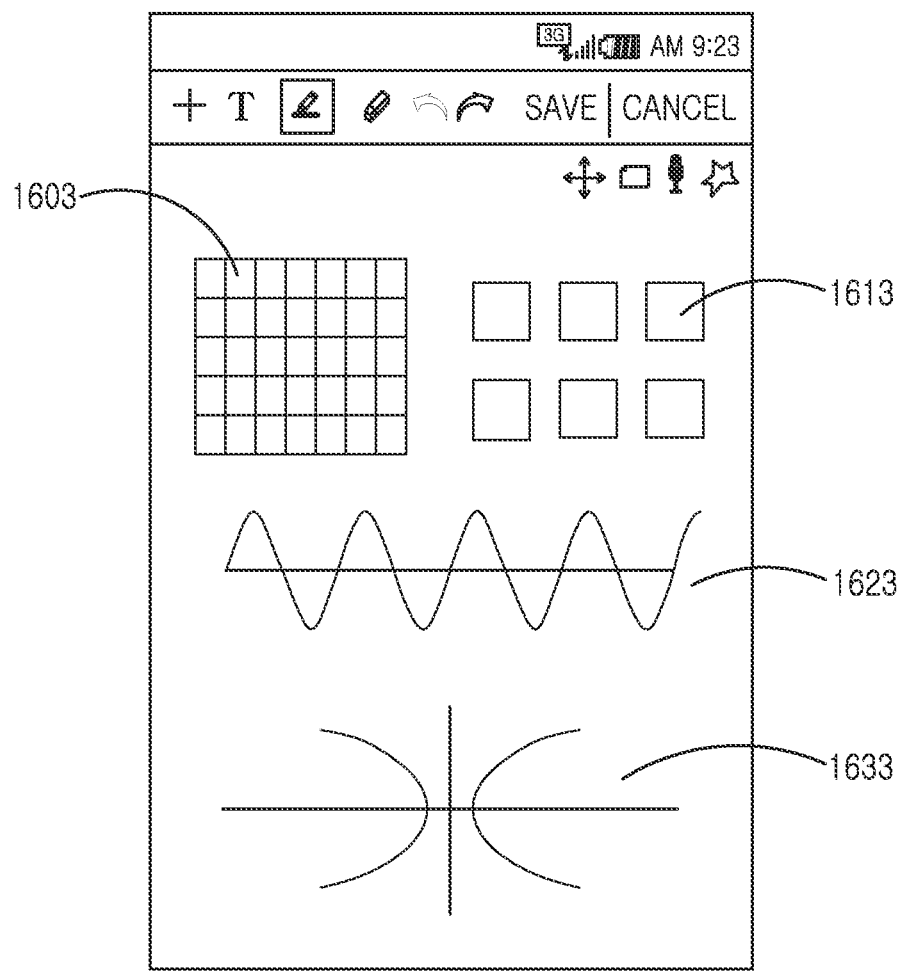

FIGS. 16A and 16B depict screens for generating writing data in an electronic device according to an embodiment of the present disclosure.

Referring to FIGS. 16A and 16B, the electronic device can generate writing data including text, figures, images, and graphs as objects of the document data, using the base information for determining the attributes and the type of the writing data as described above.

The attributes of the writing data indicate the position, the feature, and the size of the generated writing data, and the type of the writing data can be the shape of the writing data to generate.

The base information for determining the type can be the user's gesture including the pattern of the same rule. The pattern can be the input to repeatedly connecting the multiple attributes in the same pattern.

As shown in FIG. 16A, the user can draw a table, a square, and a graph in the same pattern repeated in sequence by inputting the multiple attributes.

In the table, for example, the electronic device receives the multiple attributes defining a size, a space between lines, and a width of the table, and then detects the input 1601 for connecting the horizontal lines in sequence. Upon detecting the repetitive input pattern, the electronic device can automatically connect the unconnected attributes in the pattern.

The electronic device can connect the vertical lines in the same manner, and generate and display the table 1603 as shown in FIG. 16B. The pattern can be the input for connecting the horizontal lines and the vertical lines.

For the squares, the electronic device can receive the multiple attributes for defining a size, a space between lines, and a width of the square, and then detect the input 1611 drawing the square. Upon detecting the repetitive input, the electronic device can generate a plurality of squares 1613 by automatically connecting the unconnected attributes in the pattern as shown in FIG. 16B. The pattern can repeat the input for defining the square.

For the graph, the electronic device can receive the attribute information of the inflection position of the curve, and then detect the inputs 1621 and 1631 connecting the curve in at least one cycle. Upon detecting the repetitive input, the electronic device can generate graphs 1623 and 1633 by connecting the unconnected attributes in the pattern as shown in FIG. 16B. Herein, the pattern can input for connecting the curve in at least one cycle.

The display can additionally output two or more horizontal or vertical lines, grid or lattice segment lines, or a plurality of dots at regular intervals for the sake of the more accurate input than the handwritten or voice input of the finger or the graph.

The electronic device can generate the user's intended writing data by use of the position and type information of the generated writing data.

It will be appreciated that various embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are various embodiments of machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
    detecting, by the electronic device, at least one first input;
    determining, by the electronic device, an attribute of a writing data based on the at least one first input;
    detecting, by the electronic device, a second input for determining a type of the writing data based on the at least one first input;
    determining, by the electronic device, the type of the writing data based on the second input;
    determining, by the electronic device, an output writing data based on the type of the writing data and the attribute of the writing data; and
    displaying, by the electronic device, the determined output writing data,
    wherein the attribute includes at least one of a position, a size and a feature of the writing data.

2. The method of claim 1, further comprising:
    detecting a third input that is input into the electronic device;
    changing the attribute of the writing data based on the third input;

changing the output writing data based on the changed attribute of the writing data;

displaying the changed output writing.

3. The method of claim 1, wherein the at least one first input is detected based on one of a pen pressure, a constant voltage level, a resistance, a proximity to a surface, a magnetic field strength, an input area, a voice command, or an input time based on a threshold.

4. The method of claim 3, wherein the second input is detected based on one of a pen pressure, a constant voltage level, a resistance, a proximity to a surface, a magnetic field strength, an input area, or an input time based on a threshold, that is different from the basis of detecting the first input.

5. The method of claim 1, wherein the at least one first input is detected while any one of a preset input mode and a preset input region is executed.

6. The method of claim 1, wherein the determining of the output writing data comprises:

determining a plurality of candidate output writing data;

displaying a candidate output writing data list including the plurality of candidate output writing data; and determining that the output writing data is a candidate output writing data selected by a user from the candidate output writing data list.

7. The method of claim 1, wherein the determining of the type of the writing data comprise:

correcting the type of the writing data by detecting the second input.

8. The method of claim 1, wherein the determining of the type of the writing data comprise at least one of:

comparing a type of writing data based on the second input with a prestored type of writing data and determining the type of the writing data based on the comparison result, or extracting feature information of writing data based on the second input, comparing the extracted feature information of writing data based on the second input with a prestored feature information of writing data, and determining the type of the writing data based on the comparison result.

9. The method of claim 1, wherein the determining the output writing data comprises:

determining that the writing data corresponds to a pattern based on the second input; and generating the output writing data by repeating the pattern corresponding to the second input according to the attribute of the writing data.

10. The method of claim 1, further comprising:

detecting, after detecting the at least one first input and the second input, a third input for a symbol of the writing data; and displaying the output writing data is further based on the at least one first input, the second input, and the third input.

11. The method of claim 1, wherein the at least one first input and the second input are detected via at least one of a voice command input or a handwritten input.

12. A non-transitory computer-readable storage medium storing instructions that, when executed, cause at least one processor to perform the method of:

detecting at least one first input;

determining an attribute of a writing data based on the at least one first input;

detecting a second input for determining a type of the writing data based on the at least one first input;

determining the type of the writing data based on the second input;

determining an output writing data based on the type of the writing data and on the attribute of the writing data; and displaying the determined output writing data, wherein the attribute includes at least one of a position, a size and a feature of the writing data.

13. An electronic device comprising:

a display; and at least one processor, wherein the at least one processor is configured to:

detect at least one first input, determine an attribute of a writing data based on the at least one first input, detect a second input for determining a type of the writing data that is input into the electronic device separately from the first input, determine the type of the writing data based on the second input, determine output writing data based on the type of the writing data and on the attribute of the writing data, and display the determined output writing data, wherein the attribute includes at least one of a position, a size and a feature of the writing data.

14. The electronic device of claim 13, wherein the at least one processor is further configured to:

detect a third input that is input into the electronic device;

change the attribute of the writing data based on the third input;

change the output writing data based on the changed attribute of the writing data; and display the changed output writing data.

15. The electronic device of claim 13, wherein the at least one processor is further configured to detect the at least one first input based on at least one of a pen pressure, a constant voltage level, a resistance, a proximity to a surface, a magnetic field strength, an input area, a voice command, and an input time based on a threshold.

16. The electronic device of claim 15, wherein the at least one processor is further configured to detect the second input based on one of a pen pressure, a constant voltage level, a resistance, a proximity to a surface, a magnetic field strength, an input area, or an input time based on a threshold, that is different from the basis of detecting the first input.

17. The electronic device of claim 13, wherein the at least one processor is further configured to detect the at least one first input while any one of a preset input mode and a preset input region is executed.

18. The electronic device of claim 13, wherein, to determine the type of the writing data, and determine the output writing data, the processor is further configured to:

determining a plurality of candidate output writing data, display a candidate output writing data list including the plurality of candidate output writing data, and determine that the output writing data is a candidate output writing data selected by a user from the candidate output writing data list.

19. The electronic device of claim 13, wherein the at least one processor is further configured to correct the type of the writing data based on the second input.

20. The electronic device of claim 13, wherein, to determine the output writing data, the at least one processor is further configured to at least one of:

compare a type of writing data based on the second input with a prestored type of writing data and determine the type of the writing data based on the comparison result, or extract feature information of writing data based on the second input, compare the extracted feature information of writing data based on the second input with a prestored feature information of writing data, and determine the type of the writing data based on the comparison result.

21. The electronic device of claim 13, wherein, to determine the output writing data, the at least one processor is further configured to:
   determine that the writing data corresponds to a pattern based on the second input; and
   generate the output writing data by repeating the pattern corresponding to the second input according to the attribute of the writing data.

22. The electronic device of claim 13, wherein, after detecting the at least one first input and the second input, the at least one processor is further configured to:
   detect a third input for a symbol of the writing data, and display the output writing data further based on the at least one first input, the second input and the third input.

23. The electronic device of claim 13, wherein the at least one processor is further configured to detect the at least one first input and the second input via at least one of a voice command input or a handwritten input.

* * * * *